United States Patent
Lhomme et al.

(10) Patent No.: US 12,196,097 B2
(45) Date of Patent: Jan. 14, 2025

(54) LUBRICATION RESERVOIR FOR A TURBINE ENGINE FOR AN AIRCRAFT OR SELF-PROPELLED FLYING MACHINE

(71) Applicant: SAFRAN POWER UNITS, Toulouse (FR)

(72) Inventors: Victor Georges Maurice Lhomme, Moissy-Cramayel (FR); Franck Jean-Louis Galibert, Moissy-Cramayel (FR); Gilles Aime Yann Guyader, Moissy-Cramayel (FR); Claire Madeleine Martin, Moissy-Cramayel (FR)

(73) Assignee: SAFRAN POWER UNITS, Toulouse (FR)

( * ) Notice: Subject to any disclaimer, the term of this patent is extended or adjusted under 35 U.S.C. 154(b) by 0 days.

(21) Appl. No.: 18/569,017

(22) PCT Filed: Jun. 13, 2021

(86) PCT No.: PCT/FR2021/051054
§ 371 (c)(1),
(2) Date: Dec. 11, 2023

(87) PCT Pub. No.: WO2022/263728
PCT Pub. Date: Dec. 22, 2022

(65) Prior Publication Data
US 2024/0159164 A1 May 16, 2024

(51) Int. Cl.
*F01D 25/20* (2006.01)
(52) U.S. Cl.
CPC ........ *F01D 25/20* (2013.01); *F05D 2220/323* (2013.01); *F05D 2260/98* (2013.01)

(58) Field of Classification Search
CPC ........ F16N 19/00; F16N 2210/02; F02C 7/06; F01M 11/0004; F01M 2011/0037;
(Continued)

(56) References Cited

U.S. PATENT DOCUMENTS

| 3,016,912 | A | 1/1962 | Klank, Jr. et al. |
| 5,254,145 | A | 10/1993 | Denece et al. |

(Continued)

FOREIGN PATENT DOCUMENTS

| EP | 3564509 A1 | 11/2019 |
| FR | 2687329 A1 | 8/1993 |

(Continued)

OTHER PUBLICATIONS

International Search Report and Written Opinion received for PCT Patent Application No. PCT/FR2021/051054, mailed on Oct. 16, 2023, 25 pages (13 pages of English Translation and 12 pages of Original Document).

*Primary Examiner* — Anthony Ayala Delgado
(74) *Attorney, Agent, or Firm* — WOMBLE BOND DICKINSON (US) LLP

(57) ABSTRACT

A lubrication reservoir for a turbine engine for an aircraft or self-propelled flying machine, comprising a suction strainer in a lower part of the chamber, and at least one degassing device and at least one vent in an upper part. The reservoir is wherein, in order to make it possible to supply the strainer and prohibit lubricant from intruding into the at least one vent, it includes at least one first partition that separates the lower part from the upper part and is pierced with calibrated holes, two vents arranged on either side of a vertical median plane of the chamber and two vent ducts which extend into the upper part below the degassing device, each duct comprising a bend and having the bend located on the other side of the median plane with respect to the inlet thereof.

10 Claims, 4 Drawing Sheets

(58) Field of Classification Search
CPC ... F01M 2011/0033; F01M 2013/0422; F01M 11/067; F01D 25/18
See application file for complete search history.

(56) References Cited

U.S. PATENT DOCUMENTS

| | | | |
|---|---|---|---|
| 2011/0315484 A1* | 12/2011 | Hoang | F01D 25/20 184/6.11 |
| 2014/0174093 A1 | 6/2014 | Postescu et al. | |
| 2019/0338670 A1 | 11/2019 | Reid | |

FOREIGN PATENT DOCUMENTS

| | | | |
|---|---|---|---|
| FR | 3105296 A1 | 6/2021 | |
| GB | 1339825 A | 12/1973 | |

\* cited by examiner

LUBRICATION RESERVOIR FOR A TURBINE ENGINE FOR AN AIRCRAFT OR SELF-PROPELLED FLYING MACHINE

TECHNICAL FIELD OF THE INVENTION

The technical field of the present invention is that of the lubrication reservoirs for turbine engine for aircrafts or self-propelled flying machines, and more particularly that of reservoirs that can be subjected to accelerations occurring in a direction and an orientation different from gravitational forces. The term "lubrication reservoir" refers to a reservoir capable of containing a lubricating liquid for a lubrication system of the turbine engine.

TECHNICAL BACKGROUND

Conventionally, the lubrication systems of the turbine engines comprise a reservoir of lubricant, such as oil, to supply them. The reservoir typically comprises a casing arranged at a low point of the turbine engine, in a direction and an orientation of the gravitational force, and in this casing, a strainer referred to as suction strainer, i.e., arranged at the inlet of a device intended to suck in the oil.

In most of the turbine engines, the oil return is forced by pressurised air. The degassing system, i.e., the deaerating system for turbine engine oil reservoirs generally consists of a rotating degasser, also referred to as deaerator typically located in the centre of the reservoir, which allows to evacuate excess air from the oil while keeping the oil in the reservoir, thus avoiding any loss of oil during operation.

The document FR 2.687.329-B1 describes and represents a rotating degasser comprising a bowl rotating about an axis and comprising radial vanes at a first end onto which the air-laden oil is sprayed and which communicates at a second end with an oil casing.

In normal operation of the turbine engine, i.e., with zero attitude and the lubrication system subject only to gravity, the oil is located in the oil casing. The oil is sucked towards a pump in the lubrication circuit through a suction strainer located at the bottom of the oil casing.

It is known that the aircrafts and the self-propelled flying machines can undergo lateral and/or upward acceleration when maneuvering or travelling through turbulence. The duration of these accelerations is generally limited in time, but they can occur on many occasions.

Reservoirs have been proposed to guarantee the supply of oil to the pump when it is subjected to various accelerations. Such reservoirs consist of an enclosure, at least one portion of which forms an oil casing and receives a supply strainer for supplying the lubrication circuit of the turbine engine. The oil casing can be shaped so that, in the event of lateral acceleration, the suction strainer remains immersed in the oil, thereby guaranteeing the supply to the oil pump. In addition, the rotating degasser is generally located in a central position above the oil casing to prevent the surface of the oil coming into contact with the rotating degasser, so as not to reduce its efficiency.

Such reservoirs may also comprise a strainer located at a high point in the enclosure to suck in the oil if the reservoir overturns or if the oil is subjected to a strong upward vertical acceleration. A mechanical or electrically-controlled valve system is used to close the strainer, which is immersed in the oil, to prevent the introduction of air into the lubrication circuit. The valve may, for example, be a ball that moves with gravity or an electric actuator controlled by a gravity sensor.

The ability of such lubrication systems to sustain lateral acceleration is therefore conditioned by the depth of the oil casing in the reservoir, so that a sufficient quantity of oil is present to ensure the immersion of the strainer. However, certain constraints on the integration of the reservoir into its environment mean that the oil casing is not deep enough, which severely limits the ability of the reservoir to withstand lateral acceleration.

Furthermore, when the turbine engine is subjected to purely lateral acceleration, the lubricant can become confined in the enclosure between the two strainers without either of them becoming submerged. In this case, the only solution is to add extra strainers, and as many corresponding valves or actuators, which increases the complexity of such a reservoir.

Another disadvantage of such a reservoir is that it requires a power take-off to operate the rotating degasser. However, the turbine engine cannot always be equipped with such a power take-off. In this case, the use of a static degassing device becomes imperative.

In addition, such a reservoir generally comprises at least one vent intended to evacuate the air previously separated from the oil in said reservoir. This vent is generally located at the upper part of the reservoir. It is important that this vent cannot be submerged by lubricating oil in the event of the reservoir overturning, in order to prevent a significant quantity of oil from being lost, which would adversely affect the overall operation of the lubrication system, as is the case in the document GB-1.339825-A.

To remedy this drawback, the document US-2011/0315484-A1 proposes equipping a reservoir with two vertically opposed angled vent ducts, each comprising an inlet located above the oil level and an outlet below the oil level. If the reservoir is turned upside down, the venting is performed via one duct or the other. This design does not take into account the intermediate positions of the reservoir, but can still allow oil to be evacuated through these ducts, or even block them with oil.

Similarly, a static degassing device is generally positioned at the top position of the reservoir with an outlet directed towards the bottom of the reservoir. As a result, if the reservoir is turned upside down, there is a high risk that the degassing device will be submerged at the outlet, which would reduce its effectiveness. It is therefore important that the outlet of the degassing device cannot be submerged.

SUMMARY OF THE INVENTION

The invention remedies these disadvantages by providing a reservoir configured to prevent the submersion of the vents and of the degassing device, regardless of the acceleration to which the lubricant is subjected.

To this end, the invention proposes a lubrication reservoir for a turbine engine for aircraft or self-propelled flying machine, comprising an enclosure containing a lubricant, said enclosure comprising, with reference to a direction and an orientation of the gravitational force:

in a lower part of said enclosure, a suction strainer which is located in the vicinity of a bottom of said enclosure and to which a supply duct for a lubrication circuit of the turbine engine can be connected, in an upper part of said enclosure, at least one degassing device capable of being supplied with air-laden lubricant via a lubricant return duct from the turbine engine and of separating the lubricant from the air in said enclosure, in the upper part of said enclosure, at least one vent configured to evacuate the air separated from the lubricant to the outside of said enclosure, characterised in that it comprises, to allow the strainer to be supplied and to prevent the intrusion of lubricant into said at least one vent when the lubricant is subjected to forces produced by lateral accelerations and/or a negative gravity:

at least one first partition which separates the lower part from the upper part and which is equipped with passages capable of allowing a flow of lubricant between the lower part and the upper part, in the upper part, two vents arranged on either side of a vertical median plane of the enclosure, two vent pipes, which comprise upper outlet ends communicating with the vents and which extend in the upper part to lower inlet ends opening into the reservoir below the degassing device, each pipe comprising a bend and having said bend and its upper outlet end located on the other side of said median plane with respect to its lower inlet end.

Other reservoir characteristics include:

the lower part is divided into a central compartment and two lateral compartments by two second substantially vertical partitions arranged on either side of the vertical median plane, which extend substantially between a bottom of the lower part of the enclosure and a closed upper end of said lower part of the enclosure, said central compartment receiving the strainer, and the lower part comprising lubricant passages between the central compartment and the lateral compartments, said at least one first partition comprises, in line with each lateral compartment, a tube which extends from said first partition, which dips into said lateral compartment, and which opens out in the vicinity of the bottom of the enclosure, the degassing device is a static degassing device comprising a housing comprising an inlet supplied with air-laden lubricant from the lubricant return duct, an outlet communicating with the enclosure, and a porous metallic element arranged between said inlet and outlet, the bend of each vent duct is arranged transversely, with respect to the median plane, at a distance greater than a transverse distance separating its upper outlet end from said median plane, the bend forming substantially an obtuse angle, the degassing device is arranged transversely between the two vents, the reservoir has a substantially annular tubular shape configured to surround a cylindrical casing of the turbine engine, the annular reservoir delimits a circular neck and comprises two first partitions arranged in the reservoir on either side of said neck, a stretch of each vent duct between its lower inlet end and its bend matches the neck of the reservoir, The invention also relates to an aircraft turbine engine comprising at least one lubricating oil reservoir and at least one air inlet casing of said turbine engine, characterised in that the reservoir is a reservoir of the type described above and in that it surrounds said air inlet casing.

BRIEF DESCRIPTION OF THE FIGURES

Further characteristics and advantages of the invention will become apparent from the following detailed description, for the understanding of which reference is made to the attached drawings in which.

DETAILED DESCRIPTION OF THE INVENTION

Figure 1:
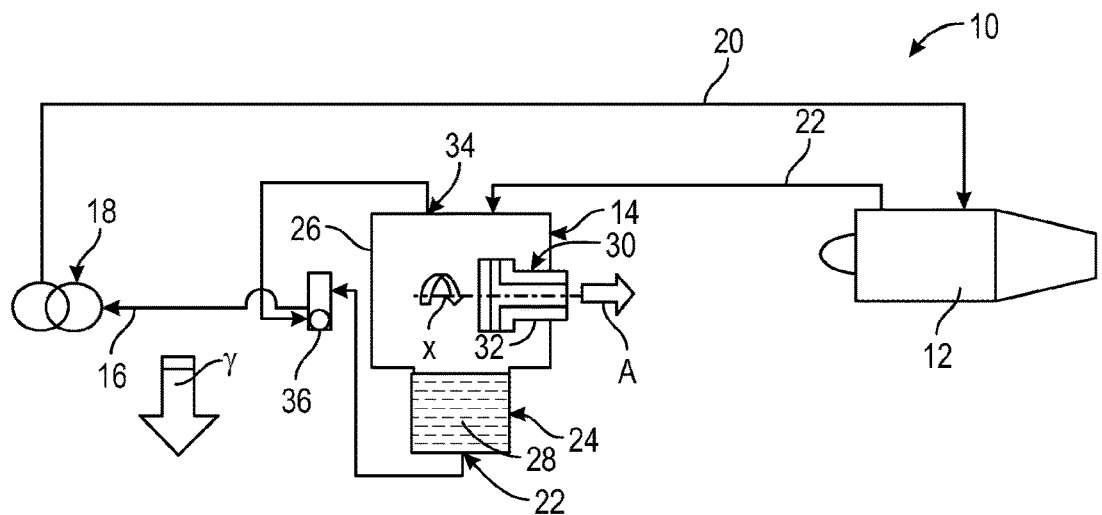
FIG. 1 is a schematic view of an attachment circuit according to a prior state of the art comprising a reservoir shown subjected to weightlessness and with zero attitude.
Figure 2:
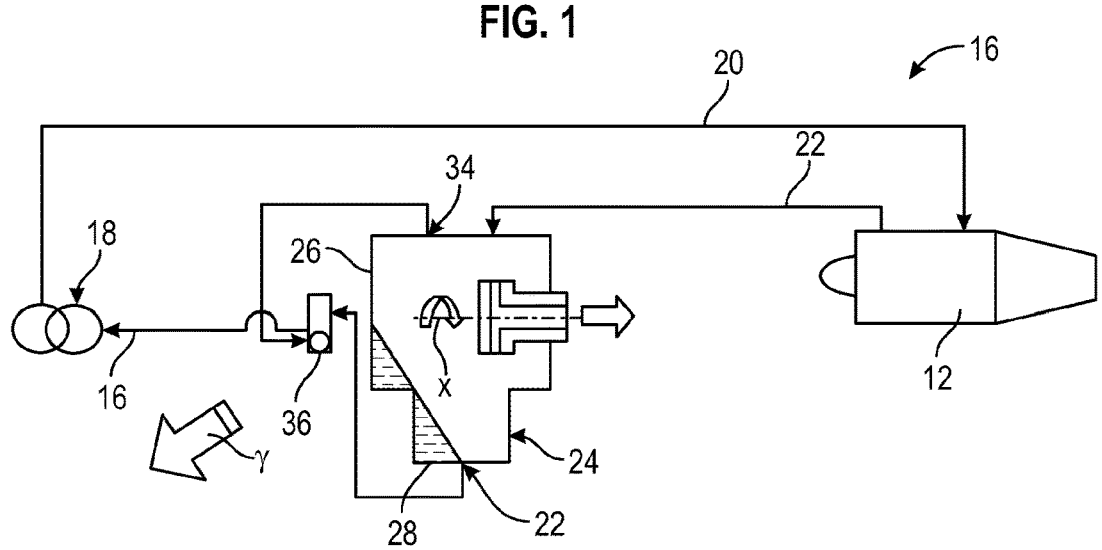
FIG. 2 is a view similar to FIG. 1 with the reservoir shown subjected to a lateral acceleration.
Figure 3:
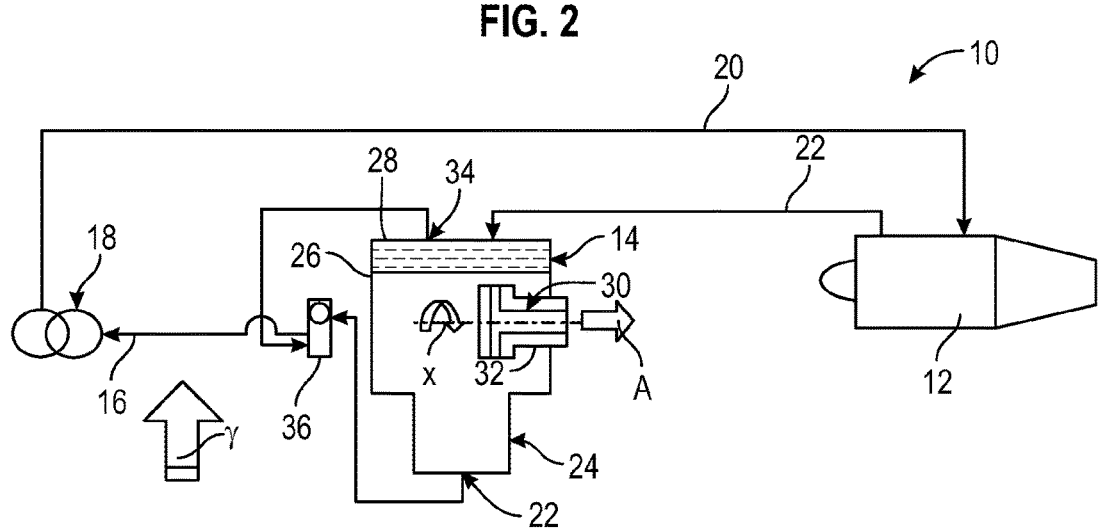
FIG. 3 is an analogous view to FIG. 1 with the reservoir shown subjected to a downward vertical acceleration producing a negative gravity.
Figure 4:
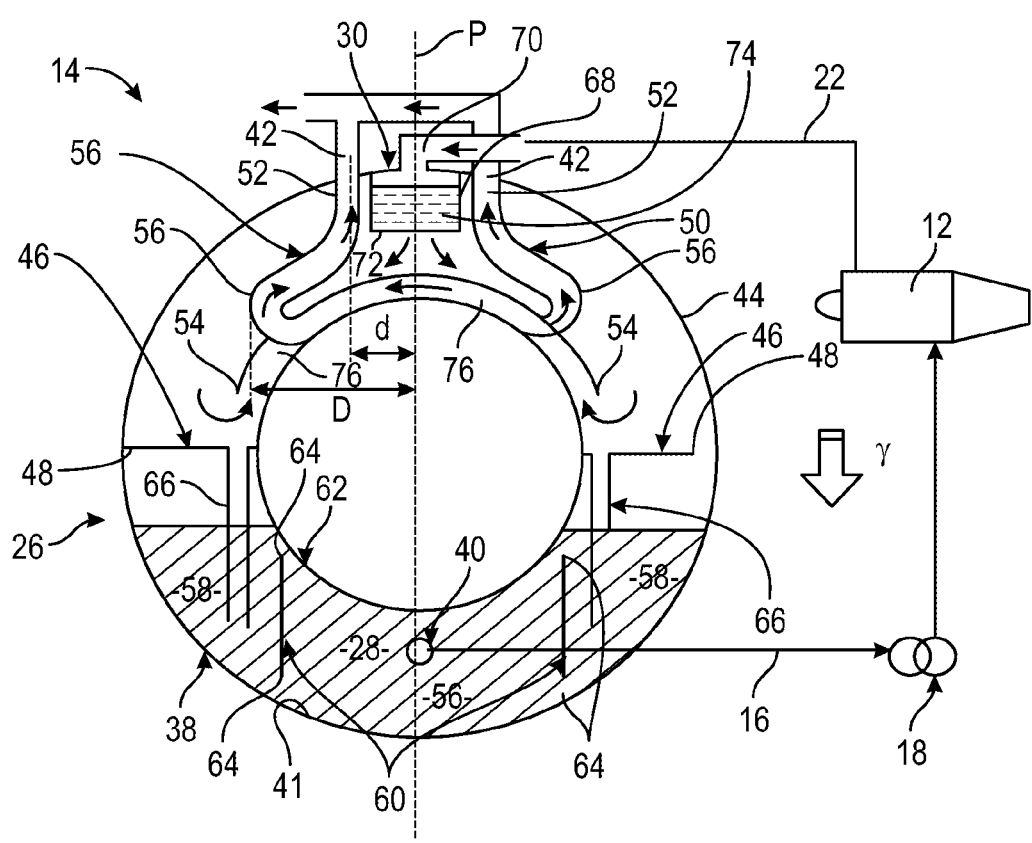
FIG. 4 is a schematic view of a reservoir according to the invention shown under gravity and with zero trim.

FIGS. 1 to 3 show a lubrication circuit 10 for a turbine engine for an aircraft or self-propelled flying machine.

In a known manner, the circuit 10 is intended to lubricate a turbine engine 12.

The circuit 10 essentially comprises a reservoir 14 which, by means of a first supply duct 16, supplies a lubrication pump 18 which, in turn, supplies the turbine engine 12 by means of a second supply duct 20.

The circuit 10 is a closed lubricant circuit, so that a return duct 22 returns the lubricant from the turbine engine 12 towards the reservoir 14 so that it can be recycled and reused in the circuit 10.

The first supply duct 16 is connected at a low point 22 of a casing 24 formed in an enclosure 26 of the reservoir 14 to a strainer referred to as suction strainer (not shown), which in a normal state of the reservoir 14 as shown in FIG. 1, i.e., with zero trim of the reservoir 14 and in the absence of acceleration other than that of the forces of gravity, is immersed in the lubricant 28.

The lubricant coming from the return duct 22, which has travelled through various pressure enclosures inside the turbine engine 12, is generally loaded with air bubbles and it is therefore necessary to deaerate it by means of a deaerator or degassing device 30.

Such a degassing device 30 is widely known in the art and essentially comprises an element 32 rotating about an axis X, as illustrated by the arrow in FIGS. 1 to 3, which allows to separate the lubricant from the air and evacuates the air, represented by an arrow A.

It is known to equip such a reservoir 14 with means allowing to ensure the continuous supply of lubricant to the first duct 16.

To achieve this, the reservoir 14 is equipped with a second lubricant suction strainer (not shown) arranged at a high point 34 of the enclosure 26 opposite the casing 24.

The first supply duct 16 is also connected to the strainer at this high point 34 by means of a reversing device 36 which allows to select, between the high point 22 and the high point 34, the lubricant supply source for the first duct 16 as a function of the position of the lubricant in the enclosure 26.

The reversing device 36 may consist, as shown in FIGS. 1 to 3, of a valve, a ball dispenser or an electric actuator controlled by a gravity sensor.

When the turbine engine is in the absence of lateral or longitudinal acceleration, i.e., when it is subject only to gravitational acceleration, the force γ resulting from the overall acceleration subjected by the turbine engine is entirely gravitational, as represented by the vertical arrow in FIG. 1. The lubricant 28 contained in the casing 24 is sucked in through the low point strainer 22 towards the pump 18, as shown in FIG. 1.

Generally, the casing 24 is dimensioned and shaped so that, when the turbine engine is subjected to a lateral acceleration combined with the gravitational acceleration that produces a resultant force γ as shown in FIG. 2, the configuration of the casing 24 allows the low point 22 to be kept immersed in the lubricant 28, which then partly leaves the casing 24 and spreads into the enclosure 26.

If the reservoir 14 overturns, or if it is subjected to a vertical acceleration in the opposite orientation to gravity, as represented by the arrow in FIG. 3 symbolising the direction of the resultant force γ, the lubricant is no longer present in the casing 24 but occupies the opposite part of the enclosure 26 and the high point 34 is then immersed in the lubricant 28. The reversing device 36 is then activated to supply the first duct 16 from the high point 34.

This configuration partially allows to prevent the lubricant supply to the first duct 16 from being interrupted. However, it has a number of disadvantages.

The capacity of the reservoir 14 to sustain lateral accelerations is conditioned by the depth and the shapes of the oil casing 24, so as to ensure that a sufficient quantity of lubricant is present to ensure the immersion of the low point strainer 22. However, certain constraints on the integration of the reservoir 14 into its environment mean that the oil casing 24 is not deep enough, which severely limits the capacity of the reservoir 14 to withstand lateral acceleration.

Furthermore, when the turbine engine 12 is subjected to purely lateral accelerations, the lubricant 28 may be confined in an intermediate part of the enclosure 26 between the two strainers at the low point 22 and high point 34 without either of these strainers being immersed in the lubricant 28. In this case, the only solution to avoid a break in the lubricant supply is to add additional strainers on the lateral walls of the enclosure 26, and as many corresponding valves or actuators, which increases the complexity of such a reservoir 14.

Another disadvantage of such a reservoir 14 is that it requires a power take-off to operate the rotating degassing device 30. However, depending on the type of turbine engine 12, the turbine engine 12 cannot always be equipped with such a power take-off. In this case, the use of a static degassing device becomes imperative.

In addition, the air separated from the oil is evacuated by means of a vent passing through the rotating degassing device 30. If the lateral acceleration to which the lubricant 28 is subjected causes it to submerge the rotating degassing device 30, the lubricant 28 may be caused to leave the enclosure 26 and this loss of lubricant may be detrimental to the correct operation of the lubrication circuit 10.

The invention remedies this disadvantage by proposing a reservoir 14 that avoids the oil supply interruptions and the submersion of its vent or vents. Such a reservoir 14 is shown in FIGS. 4 to 7.

As before, the lubrication reservoir 14 according to the invention comprises an enclosure 26 for receiving a lubricant 28. With reference to a direction and an orientation of the gravitational force, i.e., from top to bottom in FIG. 4, this reservoir 14 comprises, in a lower part 38 of the enclosure 26, a suction strainer 40 which is located in the vicinity of a bottom 41 of the enclosure 26. This strainer 40 can be connected to a supply duct 16 of the lubrication circuit of the turbine engine supplying a pump 18.

In an upper part 44 of the enclosure 26, the reservoir 14 comprises, as before, at least one degassing device 30 capable of being supplied with air-laden lubricant via a lubricant return duct 22 from the turbine engine in order to separate the lubricant from the air in the enclosure 26.

In the upper part of the enclosure 26, the reservoir 14 comprises at least one vent 42 configured to evacuate the air separated from the lubricant outside the enclosure 26.

Figure 5:
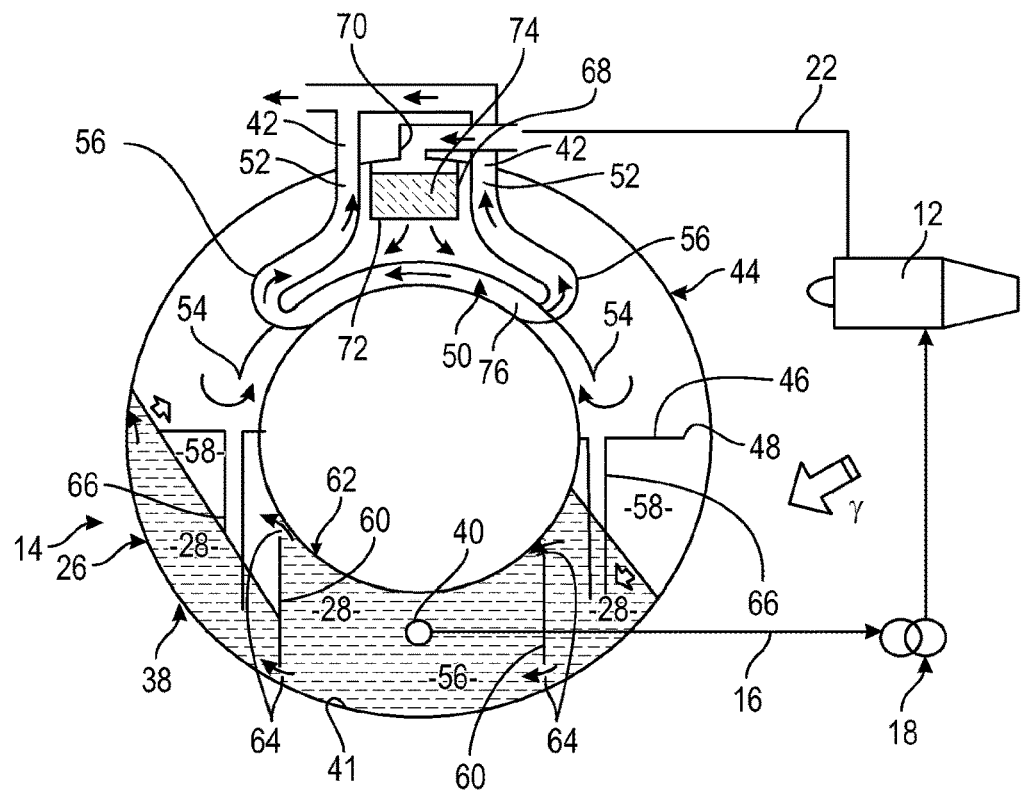
FIG. 5 is a similar view to FIG. 4 with the reservoir shown subjected to a lateral acceleration.
Figure 6:
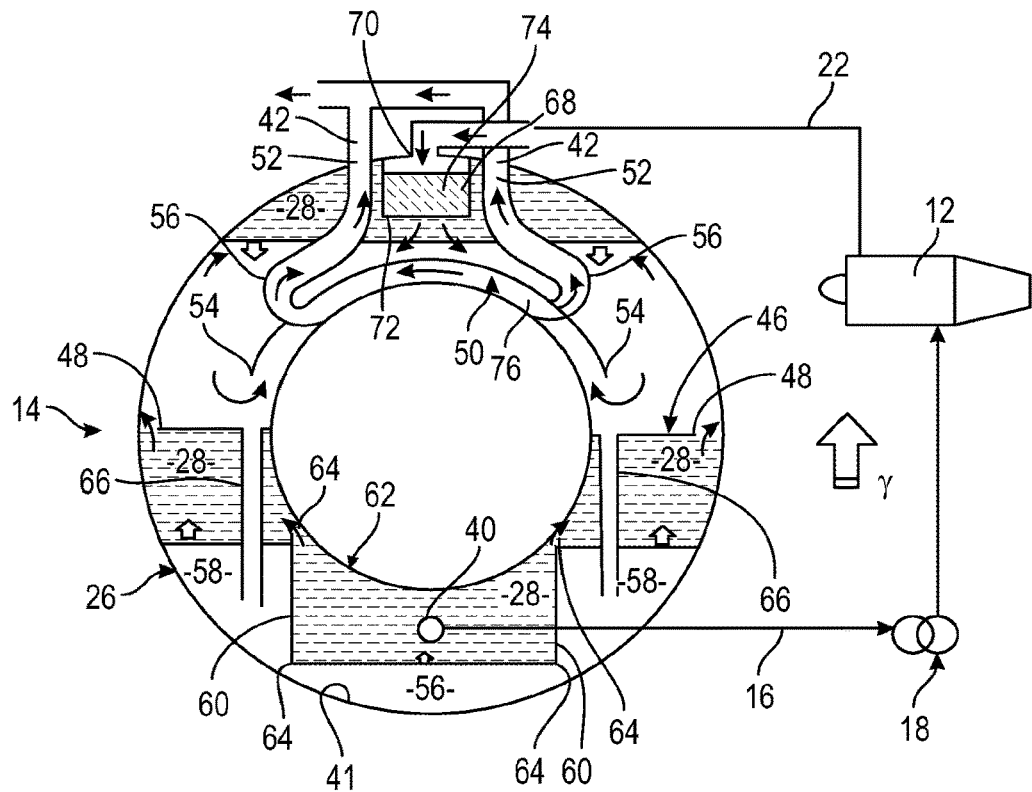
FIG. 6 is an analogous view to FIG. 4 with the reservoir shown subjected to a downward vertical acceleration producing a negative gravity.
Figure 7:
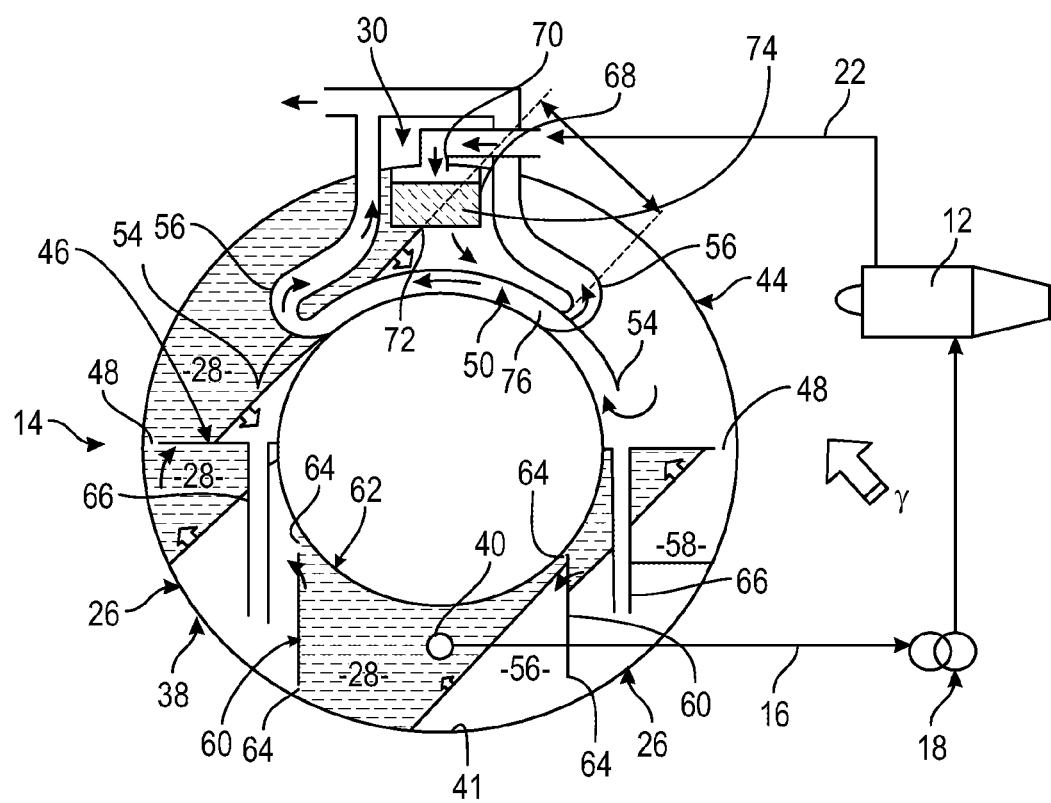
FIG. 7 is a similar view to FIG. 4 with the reservoir shown subjected to a lateral acceleration combined with a vertical downward acceleration producing a negative gravity.

In accordance with the invention, the reservoir 14 comprises, in order to allow the strainer 40 to be supplied and to prevent the intrusion of lubricant 28 into the vent 42 when the lubricant 28 is subjected to accelerations producing lateral forces or vertical accelerations γ in the opposite orientation to gravity, as represented in FIGS. 5 to 7, at least one first partition 46 which separates the lower part 38 from the upper part 44 and which comprises passages 48. These passages 48 are capable of slowing down the flow of lubricant when it passes through the first partition 46 having been subjected to a lateral and/or vertical force γ in the opposite orientation to gravity, as shown in FIGS. 5 to 7. The passages 48, which in normal operation allow lubricant separated from air to be returned from the upper part 44 towards the lower part 38, allow lubricant to pass through only at a reduced flow rate, which ensures that lubricant 28 is present around the strainer 40 in all positions of the reservoir 14.

To this end, the passages 48 can take the form of piercings or calibrated holes formed in the first partition 46. They may also consist of clearances formed between all or part of the edges of the first partition 46 and an adjacent wall of the enclosure 26. These clearances are calibrated and define lubricant passage windows between the first partition 46 and the adjacent wall, allowing lubricant to pass through only at a reduced flow rate.

Thus, when the reservoir 14 is subjected to an acceleration that produces a resultant force γ with an upwardly directed vertical component, as shown in FIGS. 5 to 7, there is still enough lubricant 28 around the strainer 40 to ensure the supply of the lubrication circuit.

In the upper part 44, the reservoir 14 also comprises two vents 42 arranged on either side of a vertical median plane P of the enclosure 26.

Advantageously, the reservoir 14 also comprises two vent pipes 50, which comprise upper outlet ends 52 in the upper part 44, communicating with the vents 42. These vent pipes 50 extend in the upper part 44 up to free lower inlet ends 54 of these pipes 50, which open into the reservoir 14 below the degassing device 30.

In particular, this configuration allows to prevent the lower inlet ends 54 of the pipes 50 from being submerged by the lubricant 28, as shown in FIG. 6, in the event of the reservoir 14 being overturned, thereby ensuring the ventilation of the reservoir 14 without the risk of losing the lubricant 28.

Advantageously, each pipe 50 comprises a bend 56. Each bend 56 and the upper outlet end 52 of the vent pipe 50 are located on the other side of the median plane P relative to its lower free inlet end 54 of the same pipe 50.

This configuration is particularly advantageous, because when the lubricant 28 is subjected to an acceleration having a lateral component causing the lubricant 28 to accumulate on one side of the enclosure 26 as shown in FIG. 7, it is thus guaranteed that the venting of the reservoir 26 through the vent 42 which is on the side of the lubricant 28 accumulation is nevertheless ensured since the free end 54 of the vent pipe 50 is on the opposite side.

These characteristics correspond to a basic configuration of the reservoir 14, which can however be perfected.

Advantageously, the lower part 38 is divided into a central compartment 56 and two lateral compartments 58 by two second substantially vertical partitions 60 arranged on either side of the vertical median plane P. These second partitions 60 extend substantially vertically between the bottom 41 of the lower part 38 of the enclosure 26 and a closed upper end of this lower part 38 of the enclosure 26.

In the example shown here, the reservoir 14 has a substantially annular tubular shape configured to surround a cylindrical casing of a turbine engine, for example an air intake casing of the turbine engine. The annular reservoir 14 therefore delimits a circular neck 62, which can be formed by this air inlet casing, and the closed upper end of the lower part 38 of the enclosure 26 is closed by the circular neck 62 and the first two partitions 46 which form a continuity.

The first two partitions 46 are preferably arranged in the reservoir 26 on either side of the neck 62 in order to guarantee an adequate volume of lubricant 28.

It will be understood that the shape of the reservoir 14 is not limitative of the invention and that the reservoir may not have an annular shape and may be without a neck 62. In this case, the reservoir 14 would comprise only a single first partition 46 which would extend transversely along the entire width of the reservoir 14 and would close off the entire upper end of the lower part 38 of the enclosure 26.

The lower part 38 is divided so that the central compartment 56 and the two compartments 58 arranged on either side of the central compartment 58 can exchange lubricant 28 with the central compartment 56 at a reduced flow rate.

To this end, the lower part 38 comprises calibrated lubricant passages 64 allowing lubricant to pass between the central compartment 56 and the lateral compartments 58.

These passages 64 can be arranged, by way of example and non-limiting to the invention, at the upper and lower ends of the second partitions 60.

Alternatively, the upper and lower ends of the second partitions 60 could be joined to the neck 62 and the bottom 41 of the enclosure 26 and the passages could be delimited between the reservoir and the axial ends of the second partitions 60.

The role of these passages 64 is double. They allow the air-free lubricant 28 to be returned from the upper part 44 to the central compartment 56 after passing through the lateral compartments 58, and also limit the loss of lubricant 28 from the central compartment 56 towards the compartments 58 when the reservoir is subjected to forces γ orientated vertically in opposite orientation of gravity or laterally, as shown in FIGS. 5 to 7. The interposition of the lateral compartments 58 between the central compartment 56 and the upper part 44 forms baffles capable of slowing the flow of the lubricant 28.

Advantageously, whatever the shape of the reservoir 14, each first partition 46 comprises, in line with each lateral compartment 58, a tube 66 which extends from this first partition 46, which dips into the lateral compartment 58, and which opens out in the vicinity of the bottom 41 of the enclosure 26. In the case shown here, the reservoir 14 therefore comprises two tubes 66, one tube 66 in line with each lateral compartment 58.

The role of each tube 66 is to allow the return of the lubricant 28 separated by the degassing device 30 while preventing the passage of lubricant from the lateral compartments 58 towards the upper part 44 of the enclosure 26 in the event of overturning, since the free end of the tubes 66 is then above the level of the lubricant 28 in the lateral compartments 58 as shown in FIGS. 6 and 7.

Another particularly advantageous configuration of the invention is that the degassing device 30 is a static degassing device which does not require any movement on the turbine engine which is supplied by the reservoir 14. To this end, the degassing device 30 comprises a housing 68 comprising an inlet 70 supplied with air-laden lubricant from the lubricant return duct 22, an outlet 72 communicating with the enclosure 26, and a porous metallic element 74 arranged between these inlet 70 and outlet 72.

By way of example, and not as a limitation of the invention, the metallic element 74 can be made of a metallic foam. The degassing device 30 is arranged transversely between the two vents 42.

Advantageously, to absolutely prevent the intrusion of lubricant 28 into the vent ducts 50, the bend 56 of each vent duct 50 is arranged transversely, with respect to the median plane P, at a distance D greater than a transverse distance d separating its upper outlet end 52 from said median plane P. In this configuration, the bend 56 forms a substantially obtuse angle in the shape of a hairpin, which slows down the passage of the lubricant towards the vents 42.

In the annular reservoir 14 configuration shown here, a stretch 76 of each vent duct 50 between its lower free inlet end 54 and its bend 56 conforms to the neck 62 of the reservoir 14.

The particular shape of the annular reservoir 14 shown here is particularly applicable to an arrangement of the reservoir 14 around a turbine engine comprising an air inlet casing (not shown) which is by definition a cold area of the turbine engine. The neck 62 thus provides an exchange surface with the air inlet casing of the turbine engine, which allows the reservoir 14 and consequently all the lubricant 28 to be cooled.

It should be noted that the neck 62 of the reservoir 14 could be made directly from the casing of the turbine engine.

It may also be envisaged that the neck 62 is provided inside the enclosure 26 with exchange surfaces such as fins to ensure cooling of the inside of the enclosure 26.

The invention therefore allows to significantly improve the performance of a lubrication reservoir comprising a degassing device.

The invention claimed is:

1. A lubrication reservoir for a turbine engine for an aircraft or self-propelled flying machine, comprising an enclosure containing a lubricant, said enclosure comprising, with reference to a direction and an orientation of the gravitational force:
   in a lower part of said enclosure, a suction strainer which is located in the vicinity of a bottom of said enclosure and to which a supply duct (16) of a lubrication circuit of the turbine engine can be connected,
   in an upper part of said enclosure, at least one degassing device capable of being supplied with air-laden lubricant via a lubricant return duct from the turbine engine and of separating the lubricant from the air in said enclosure,
   in the upper part of said enclosure, at least one vent configured to evacuate the air separated from the lubricant outside said enclosure,
   wherein the lubrication reservoir allows the strainer to be supplied and to prevent the intrusion of lubricant into said at least one vent when the lubricant is subjected to forces (γ) produced by lateral accelerations and/or a negative gravity:

at least one first partition which separates the lower part from the upper part and which is equipped with passages capable of allowing the lubricant to flow between the lower part and the upper part, in the upper part, two vents arranged on either side of a vertical median plane of the enclosure, two vent pipes, which comprise upper outlet ends communicating with the vents and which extend in the upper part as far as lower inlet ends opening into the reservoir below the degassing device, each pipe comprising a bend and having said bend and its upper outlet end located on the other side of said median plane relative to its lower inlet end.

2. The reservoir according to claim 1, wherein the lower part is divided into a central compartment and two lateral compartments by two second substantially vertical partitions arranged on either side of the vertical median plane, which extend substantially between a bottom of the lower part of the enclosure and a closed upper end of said lower part of the enclosure, said central compartment receiving the strainer, and the lower part comprising lubricant passages between the central compartment and the lateral compartments.

3. The reservoir according to claim 2, wherein said at least one first partition comprises, in line with each lateral compartment, a tube which extends from said first partition, which dips into said lateral compartment, and which opens out in the vicinity of the bottom of the enclosure.

4. The reservoir according to claim 1, wherein the degassing device is a static degassing device comprising a housing comprising an inlet supplied with air-laden lubricant from the lubricant return duct, an outlet communicating with the enclosure, and a porous metallic element arranged between said inlet and outlet.

5. The reservoir according to claim 1, wherein the bend of each vent duct is arranged transversely, with respect to the median plane, at a distance greater than a transverse distance separating its upper outlet end from said median plane, the bend forming substantially an obtuse angle.

6. The reservoir according to claim 1, wherein the degassing device is arranged transversely between the two vents.

7. The reservoir according to claim 1, wherein it has a substantially annular tubular shape configured to surround a cylindrical casing of the turbine engine.

8. The reservoir according to claim 7, wherein the annular reservoir defines a circular neck and in that it comprises two first partitions arranged in the reservoir on either side of said neck.

9. The reservoir according to claim 8, wherein a stretch of each vent duct between its lower inlet end and its bend matches the neck of the reservoir.

10. A turbine engine for an aircraft or self-propelled flying machine, comprising at least one lubricating oil reservoir and at least one air inlet casing of said turbine engine, wherein the reservoir is a reservoir according to claim 7 and in that it surrounds said air inlet casing.

* * * * *